United States Patent
Verhoog

(10) Patent No.: US 8,795,092 B2
(45) Date of Patent: Aug. 5, 2014

(54) ANGULAR DAMPING DEVICE FITTED WITH FRICTION MEANS VARIABLE ACCORDING TO ROTATION SPEED

(75) Inventor: Roel Verhoog, Gournay sur Aronde (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 13/701,272

(22) PCT Filed: May 25, 2011

(86) PCT No.: PCT/FR2011/051188
§ 371 (c)(1),
(2), (4) Date: Dec. 17, 2012

(87) PCT Pub. No.: WO2011/151570
PCT Pub. Date: Dec. 8, 2011

(65) Prior Publication Data
US 2013/0098731 A1    Apr. 25, 2013

(30) Foreign Application Priority Data
Jun. 1, 2010 (FR) .................................... 10 54239

(51) Int. Cl.
*F16F 15/129* (2006.01)
(52) U.S. Cl.
USPC ............................................. 464/68.4

(58) Field of Classification Search
USPC ............. 464/68.2, 68.4, 68.41; 192/201, 210, 192/210.1, 213.11, 213.12, 213.21, 213.22, 192/213.3, 213.31, 214, 214.1
See application file for complete search history.

(56) References Cited

U.S. PATENT DOCUMENTS 4,904,226 A * 2/1990 Chasseguet et al. ........ 464/68.41
5,884,743 A * 3/1999 Kleifges et al. .......... 192/213.12

FOREIGN PATENT DOCUMENTS

| | | |
|---|---|---|
| EP | 0 482 735 | 4/1992 |
| WO | WO 2009/015632 | 2/2009 |

* cited by examiner

*Primary Examiner* — Gregory Binda
(74) *Attorney, Agent, or Firm* — Berenato & White, LLC

(57) ABSTRACT

An angular damping device (10) for a motor vehicle temporary wet coupling system comprises two radial guide washers (24) which are positioned axially one on each side of a web (12), at least two elastic members (38) with circumferential action which are circumferentially interposed in series between the web (12) and the guide washers (24), and a phase member (42) which comprises at least one radial phase lug (48). The phase member (42) further comprises two friction pads which can parted axially against each of the guide washers (24). Each of the friction pads comprises a retaining face (54) for retaining an elastic member (38) against the action of centrifugal force. The elastic member (38) is partially inserted between the two retaining faces (54) in the manner of a wedge.

16 Claims, 5 Drawing Sheets

ANGULAR DAMPING DEVICE FITTED WITH FRICTION MEANS VARIABLE ACCORDING TO ROTATION SPEED

CROSS-REFERENCE TO RELATED APPLICATIONS AND CLAIM TO PRIORITY

This application is a national stage application of International Application No. PCT/FR2011/051188 filed May 25, 2011, which claims priority to French Patent Application No. 10/54239 filed Jun. 1, 2010, of which the disclosures are incorporated herein by reference and to which priority is claimed.

FIELD OF THE INVENTION

The present invention relates to an angular damping device for a motor vehicle temporary wet coupling system.

The present invention more particularly relates to an angular damping device between a first coaxial shaft and a second coaxial shaft in a motor vehicle temporary wet coupling system which comprises:
- a radial web which is intended to be rotationally coupled to the first shaft;
- two radial guide washers which are positioned axially one on each side of the web and which are rotationally coupled to the second shaft;
- at least two elastic members with circumferential action which are circumferentially interposed in series between the web and the guide washers;
- a phase member which comprises at least one radial phase lug circumferentially interposed between two elastic members in series, the phase member comprising at least two friction pads which can be axially pressed towards each of the two radial guide washers by application of an axial clamping force so that they are axially clamped against each of the guide washers.

BACKGROUND OF THE INVENTION

Such a damping device is generally used in automatic clutch systems, of the torque converter type, to transmit torque between a turbine shaft and a friction locking clutch.

Such a device can also be used in a so-called "wet" friction clutch.

Such a damping device in particular is used to filter the vibrations coming from the engine, in particular due to elastic members and associated so-called "hysteresis" friction pads.

The damping devices of this type are very effective in attenuating vibrations in certain given frequency ranges. However, a resonance phenomenon has been observed whose frequency and level vary according to the rotation speed of the damping device on the one hand and the transmitted torque on the other hand.

SUMMARY OF THE INVENTION

The object of the present invention is to mitigate this drawback by proposing a damping device of the type described above, characterized in that each friction pad comprises at least one retaining face of at least one of the elastic members against the action of centrifugal force, the retaining faces being axially positioned at a distance from one another and the elastic member being partially inserted between the two retaining faces in the manner of a wedge, so that the axial component of the centrifugal force exerted on each retaining face by the elastic member clamps each friction pad against the associated guide washer with a dynamic clamping force.

According to other features of the invention:
- each retaining face is in contact with the elastic member according to an angle of incidence ranging between 1° and 89° relative to the radial direction;
- the angle of incidence ranges between 15° and 45°, a static clamping force being permanently applied by clamping elastic means in order to press the friction pads;
- each friction pad is formed by a resiliently flexible deformable lug, said deformable lug being mounted prestressed against the associated guide washer;
- at least one of the deformable lugs is formed by a phase lug;
- the inner face of the two guide washers comprises ramps facing one another in such a manner as to vary the axial position of the friction faces relative to a reaction face, so that the static clamping force varies according to the angular position of the phase member relative to the guide washers.

DETAILED DESCRIPTION OF DRAWINGS

Other features and advantages of the invention will become apparent upon reading the detailed definition which follows for comprehension of which reference shall be made to the appended drawings among which:

DETAILED DESCRIPTION OF PREFERRED EMBODIMENTS

For continuing the description, the following are adopted:
- axial orientation directed back and forth along the rotational axis of the damping device, and indicated by the arrow "A" of the figures,
- radial orientation directed orthogonally to the axis of the damping device from the interior to the exterior going away from said axis;
- circumferential orientation directed orthogonally to the axis of the damping device and orthogonally to the radial directions.

For continuing the description, elements with similar, identical or the same functions are designated with the same reference numbers.

Figure 1:
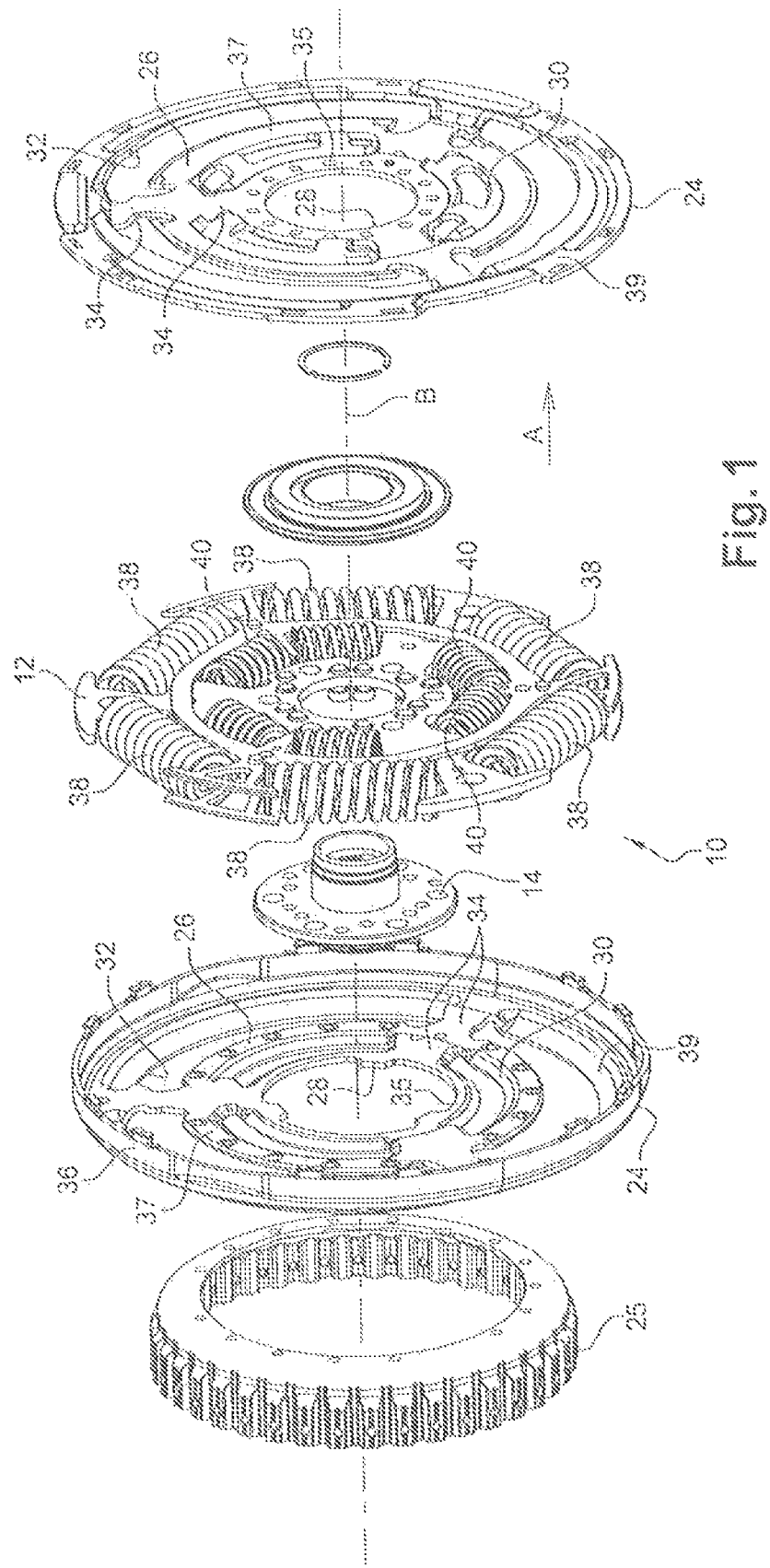
FIG. 1 is an exploded perspective view illustrating a damping device made according to the teachings of the invention.

FIG. 1 shows an angular damping device which is intended to be arranged in a motor vehicle temporary coupling system. The damping device 10 here is intended to be arranged in a so-called "wet" torque converter (not shown) for coupling, with angular damping, a turbine of the converter to a locking clutch of the converter.

The angular damping device made according to the teachings of the invention can also be applied to any other type of so-called "wet" clutch systems in which the damping device 10 can be immersed in a liquid such as oil.

The angular damping device 10 enables a first driving shaft (not shown) to be coupled, with angular damping, to a second driven shaft (not shown) coaxial with axis "B".

The device 10 comprises a torque input member which is formed here by a radial web 12 which is intended to be rotationally coupled to the first driving shaft. As shown in more detail on FIG. 2, the web 12 has the shape of a circular washer coaxial with axis "B" and which is intended to be rotationally coupled with a hub 14.

The web 12 has three windows 16 which are arranged in an arc along a ring coaxial with axis "B". The windows are regularly distributed around axis "B", so that the windows extend at an angle of approximately 120°. The windows 16 are circumferentially separated from one another by three radial thrust spokes 18.

In addition the web 12 on its periphery comprises three external thrust lugs 20. Each external thrust lug 20 extends radially projecting from the outer peripheral edge of the web 12.

The free outer end of each external thrust lug 20 in addition exhibits two edges 22 which circumferentially extend projecting from either side of the external lug 20. Each external lug 20 thus has the form of a "T".

The external lugs 20 here are arranged in angular coincidence with the spokes 18.

As shown on FIG. 1, the damping device 10 in addition exhibits a torque output member which is formed here by two radial guide washers 24 which are axially arranged on either side of the web 12. The two guide washers 24 are rotationally connected to the second shaft by means of a splined hub 25.

Each guide washer 24 exhibits a radial flange 26 which is provided with a central passage 28 to allow the passage of the drive shaft and the hub 14 of the web 12.

Each flange 26 is also perforated by three interior windows 30 each of which is arranged to align with the windows 16 of the web 12.

Each flange 26 further includes three exterior windows 32 which are arranged to align with the spaces circumferentially delimited by two external thrust lugs 20 of the web 12.

The interior 30, respectively exterior 32 windows of each flange 26 are circumferentially separated from one another by spokes 34 which have an axial curvature directed towards the web 12.

The rear guide washer 24 also has an outer peripheral skirt 36 axially extending towards the other guide washer 24. The free axial edge of the skirt 36 is intended to be fixed to the outer peripheral edge of the front guide washer 24.

Thus, the flange 26 of each guide washer 24 has an inner ring 35 which radially separates the central passage 28 of the interior windows 30, an intermediate ring 37 which radially separates the interior windows 30 from the exterior windows 32, and an outer ring 39 which radially separates the exterior windows 32 of the skirt 36.

When the two guide washers 24 are assembled, their flanges 26 are spaced apart by a distance sufficient to allow the web 12 to rotate between the two flanges 26 without friction.

The damping device 10 further comprises a first outer row of elastic members 38 with circumferential action and a second inner row of elastic members 40 with circumferential action.

The elastic members 38, 40 are formed here by coil springs, the principal axis of which being of circumferential orientation.

In the inner row, the elastic members 40 are divided into three groups of two elastic members 40. The elastic members 40 of each group are circumferentially located in series in a common associated window 16 of the web 12, as shown on FIG. 2.

In the outer row, the elastic members 38 are divided into three groups of two elastic members 38. The elastic members 38 of each group are circumferentially located in series between two associated thrust lugs 20 of the web 12, as shown on FIG. 2.

Figure 3:
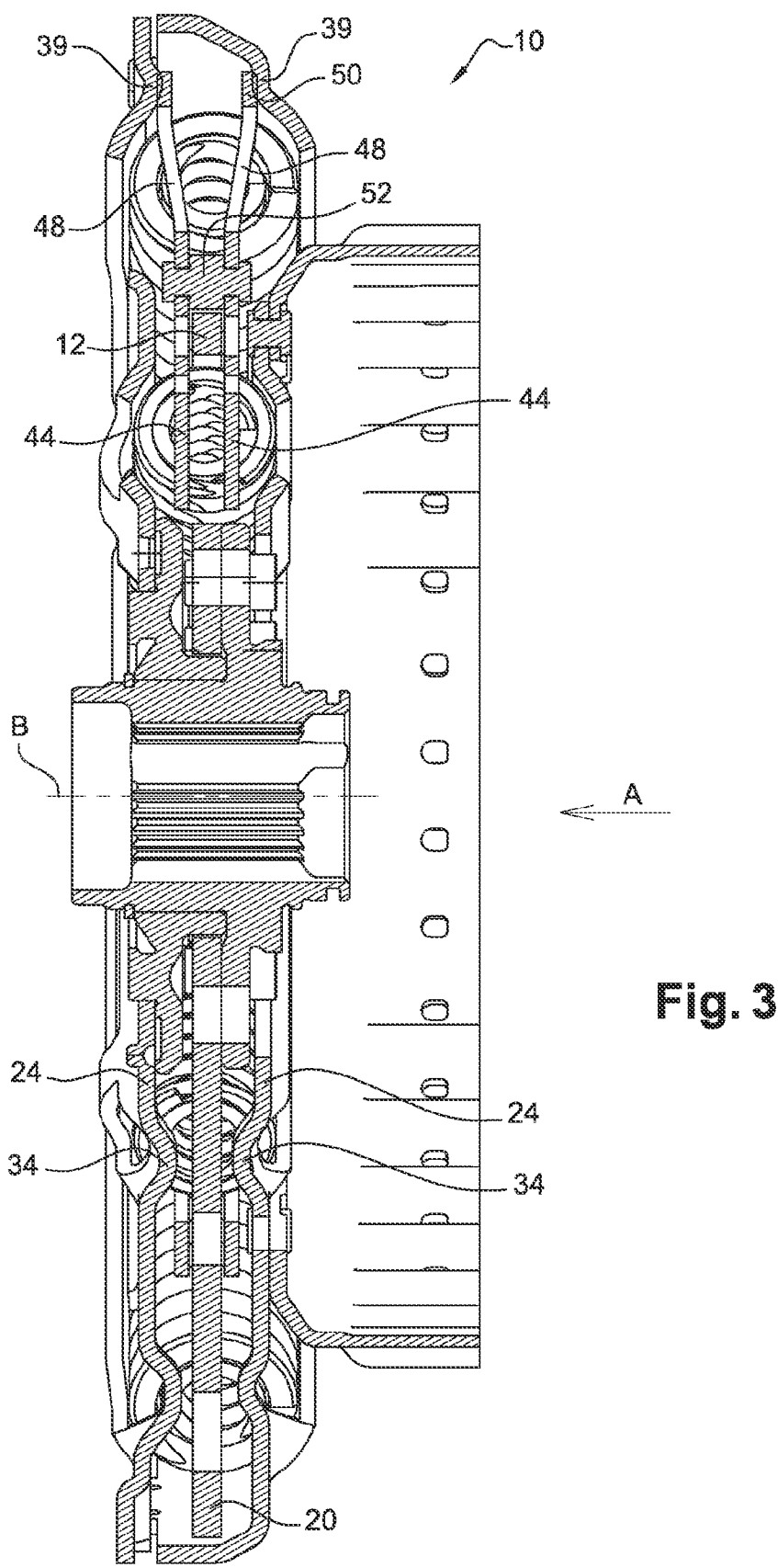
FIG. 3 is an axial view of the damping device according to the teachings of the invention in which a guide washer has been removed to enable the interior of the damping device to be seen.

The elastic members 38, 40 are axially secured in their respective housings by the edges of the interior 30 and external 32 windows of the guide washers 24, as shown in more detail on FIG. 3.

Each group of two elastic members 38, 40 is thus circumferentially interposed in series between the web 12 and the guide washers 24.

More specifically, for the inner row, each group of two elastic members 40 is circumferentially interposed between a radius 18 of the web 12 and the corresponding spokes 34 of the guide washers 24. The spokes 34 of the guide washers 24 in effect have a curvature as shown on FIG. 3 which enables them to come into contact with an end of one of the elastic members 40 of the group.

Similarly, for the outer row, each group of two elastic members 38 is circumferentially interposed between a thrust lug 20 of the web 12 and the corresponding spokes 34 of the guide washers 24. The spokes 34 of the guide washers 24 also have a curvature as shown on FIG. 3 which enables them to come into contact with an end of one of the elastic members 40 of the group.

The two elastic members 38, 40 of each group being mounted in series, the two ends facing these two elastic members 38, 40 are adapted to bear on one another during the transmission of torque between the web 12 and the guide washers 24.

So that the elastic members 38, 40 are stressed substantially along their principal axis, it is known to provide the damping device 10 with a phase member 42.

Figure 2:
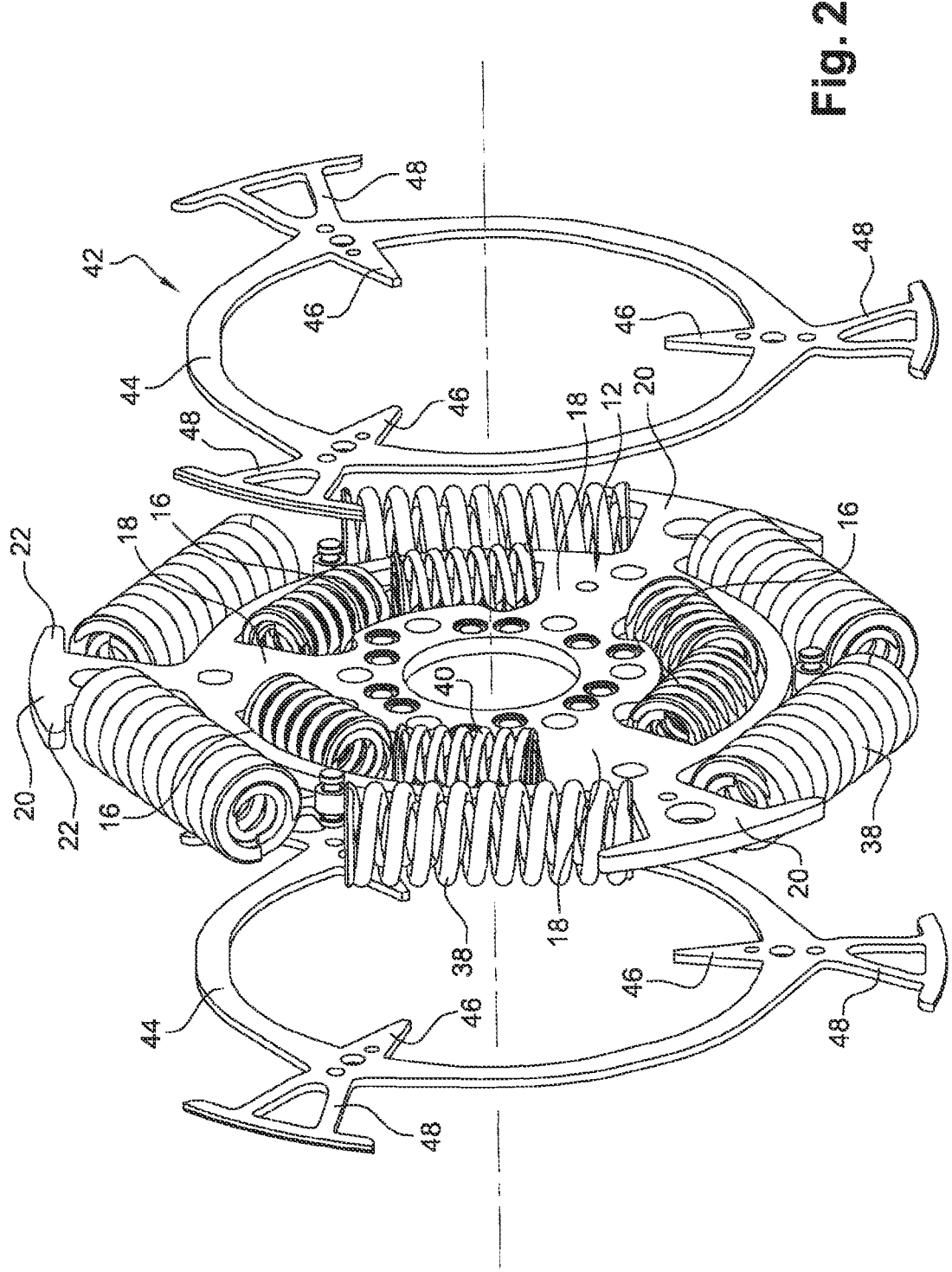
FIG. 2 is an exploded perspective view illustrating the elastic members, the web and the phase member of the device on FIG. 1.

Such a phase member 42 is shown in more detail on FIG. 2. The phase member 42 is formed here by two radial phase rings 44 which have dimensions corresponding to the intermediate ring 37 of the guide washers 24.

Each phase ring 44 further includes three inner phase lugs 46 which radially extend towards the interior and three outer phase lugs 48 which radially extend towards the exterior. Each inner phase lug 46 is arranged in angular coincidence with an outer phase lug 48.

The phase lugs 46, 48 are regularly arranged around the phase ring 44, substantially 120° from each other.

Figure 4:
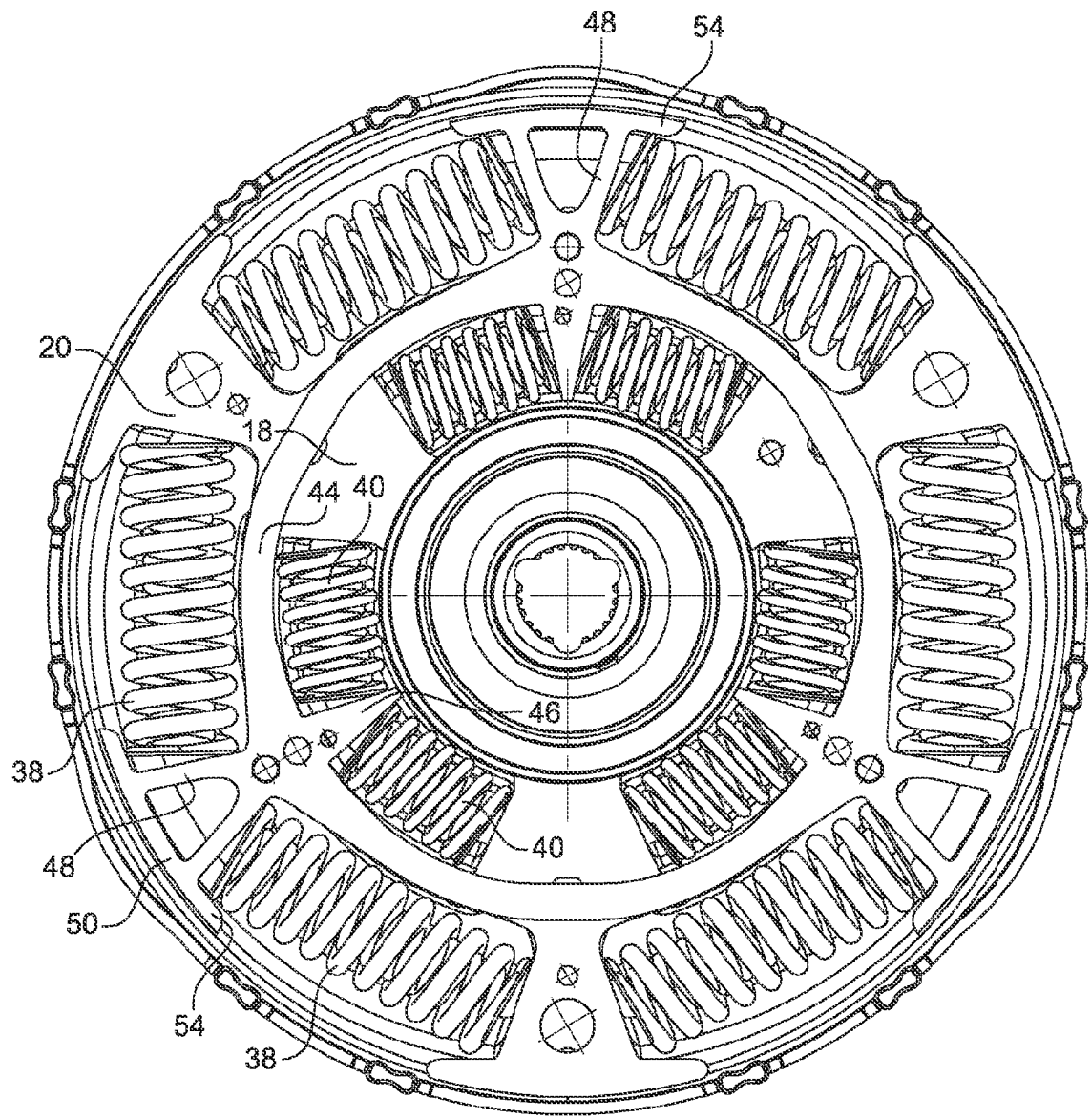
FIG. 4 is an axial sectional view of the damping device in which the friction pads of the device are visible.

As shown on FIGS. 3 and 4, each phase lug 46, 48 is circumferentially interposed between the two elastic members 38, 40 in series of each group.

The phase rings 44 are axially arranged on both sides of the web 12, as shown on FIG. 3. Each phase ring 44 more particularly is mounted floating between the web 12 and the associated guide washer 24. The phase rings 44 are held in position through the contact between the phase lugs 46, 48 and the elastic members 38, 40.

During operation of the damping device 10, the elastic members 38, 40 are generally compressed so as to cushion the torque surges. The web 12 rotates at a specific angle around axis "B" relative to the guide washers 24, causing compression of the elastic members 38, 40 of each group. Because of this compression, the phase rings 44 rotate at half of the specific angle relative to the guide washers 24.

It was found that the damping device 10 could vibrate in a harmful way with certain higher speeds of rotation and/or torque values.

To solve this problem, it is proposed to equip the phase member 42 with at least two friction pads which can be axially separated by application of an axial clamping force so that a friction face 50 of said friction pads is axially clamped against each inner face of the guide washers 24. Thus, the contact between the phase member 42 and the guide washers 24 can eliminate certain vibrations.

The friction pads are arranged in pairs between two guide washers 24, so that two friction faces 50 of a pair are axially aligned. Thus, while the two friction pads of a pair are axially separating, the friction face 50 of each will rub against the inner face of an associated guide washer 24.

The friction pads are advantageously formed by the outer phase lugs 48. Each friction face 50 is carried by a free outer end portion of each outer phase lug 48. Each friction face 50 is thus axially disposed opposite to the outer ring 39 of one of the guide washers 24.

To enable clamping of each friction face 50, each outer phase lug 48 is flexible in an axial direction and defines elastic clamping means.

According to one variant of the invention, not shown, the friction pads are formed by flexible lugs distinct from the phase lugs and defining elastic clamping means. They are for example lugs radially extending inwards from a second outer peripheral ring which is carried by each phase lug.

The friction faces 50 here are clamped against the associated guide washer 24 with a so-called "static" clamping force. This is an axial clamping force, the intensity of which being independent of the rotation speed of the damping device 10.

The static clamping force is constantly applied by the elastic clamping means for pressing the friction pads.

Advantageously, the outer phase lugs 48 of the two phase rings 44 are resiliently flexible. At rest each outer phase lug 48 of a phase ring 44 is axially inclined in a direction opposite to the other phase ring 44. Thus, in this quiescent state, the axial distance between the friction faces 50 of a pair is greater than the axial distance between the outer rings 39 of the two guide washers 24. The outer phase lugs 48 are thus axially mounted pre-stressed between the guide washers 24.

In the example shown on FIG. 3, the two phase rings 44 are axially supported against one another by means of a spacer 52. Thus, the reaction of the static clamping force of a friction face 50 against a guide washer 24 is taken over by the other guide washer 24 through the other friction face 50 of the pair.

According to a variant not shown of the invention, the phase member comprises a single ring having pairs of phase lugs, the two lugs of a pair being axially aligned.

According to one variant of the invention, not shown, the reaction of the static clamping force of a friction pad is taken over by the web. In this case each phase ring axially bears on the web.

In addition it was found that the static clamping force was not sufficient to attenuate the vibrations of the damping device 10 at certain very high rotation speeds. It is found in some applications that the friction should increase with the speed in order to advantageously reduce the vibrations.

To remedy this problem, the damping device 10 proposes that a dynamic clamping force is superimposed on the static clamping force of each friction face 50. This dynamic clamping force increases in proportion to the rotation speed, thereby enabling the vibrations that occur at high speed to be attenuated to a higher degree without reducing the effectiveness of the damping device 10 at low speed on account of too great friction.

To do this, each friction pad formed by an outer phase lug 48 comprises at least one retaining face 54 of at least one of the elastic members 38 against the action of centrifugal force. The retaining face 54 is formed by an interior face of an edge which circumferentially extends on either side of the free outer end of the outer phase lug 48.

Each retaining face 54 is in permanent contact with the elastic member 38. The retaining faces 54 of a pair of phase lugs 48 are axially arranged at a distance from one another and the elastic member 38 is partially inserted between said two retaining faces 54 in the manner of a wedge. Thus, when the damping device 10 rotates, the elastic members are radially pressed between the two retaining faces 54 so as to move them apart. This causes the increase of the radial and axial load on the outer phase lugs 48 of the pair, and thus, the clamping of each friction face 50 against the associated guide washers 24.

Figure 5:
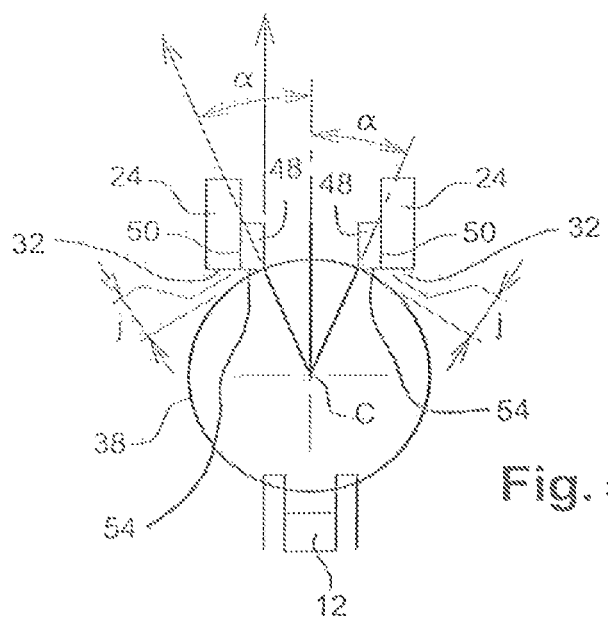
FIG. 5 is a schematic sectional view illustrating the force of an elastic member subjected to the centrifugal force exerted on the friction pad retaining faces of the phase member equipping the damping device made according to the teachings of the invention.
Figure 6:
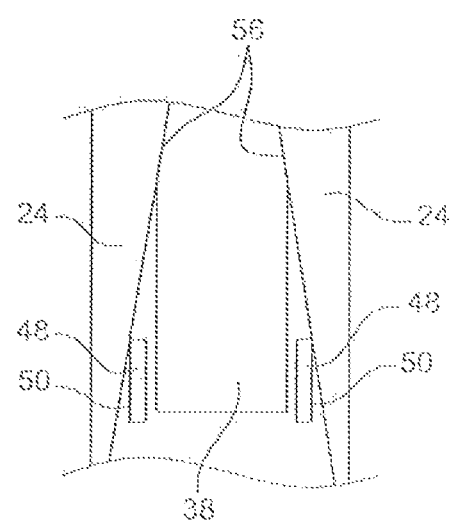
FIG. 6 is a schematic view according to a radial direction towards the interior of the damping device, illustrating the inner faces of the guide washers which are equipped with ramps against which the friction pads of the phase member rub.

To enable this effect to materialize, and as shown on FIG. 5, there is radial clearance "j" between the external edge of the corresponding external window 32 of each guide washer 24 and the elastic member 38. The radial clearance "j" is sufficient to allow the elastic member 38 to act on the retaining faces 54.

More specifically, as shown on FIG. 5, each retaining face 54 of a pair is in contact with the elastic member 38 according to an angle of incidence "α" relative to the radial direction. The force exerted by the elastic member 38 on the retaining face 54 under the effect of centrifugal force can therefore be decomposed into a dynamic axial clamping force and a vertical force.

For this effect to occur, the angle of incidence "α" ranges between 1° and 89°. It is noted that the dynamic axial clamping force is proportional to both the angle of incidence "α" and the centrifugal force.

The angle of incidence "α" is preferably between 15° and 45°.

According to one variant of the invention, not shown, the friction faces of the friction pads are not clamped against the guide washers when the damping device is not rotating. Thus, friction only occurs when the damping device rotates past a threshold speed. In this case, the radial clearance between the windows and the elastic members is greater because the elastic members may be radially displaced.

According to another aspect of the invention, the damping device 10 is also equipped with means for increasing the static clamping force depending on the torque transmitted by the web 12. The rotational angle of the web 12 relative to the guide washers 24 is all the greater, the higher the transmitted torque.

To permit this increase in the static clamping force, the inner face of the outer ring 39 of the two guide washers 24 comprises ramps 56 which circumferentially extend in an arc along the path that each friction face 50 can traverse while damping. Thus, the axial distance between the two guide washers 24 can vary according to the rotational angle of the phase rings 44.

The axial position of the friction faces 50 relative to the reaction face of the static clamping force may thus vary, the reaction face being formed here by the inner face of the other guide washer 24. This causes a variation of the static clamping force depending on the angular position of the phase rings 44 relative to the guide washers 24.

The damping device 10 made according to the teachings of the invention is thus inexpensive to produce because it does not require extra components, in particular to produce the static clamping force.

The damping device 10 is also particularly effective for damping vibrations that specifically occur when the rotation speed is high, irrespective of the transmitted torque.

In addition, the dynamic clamping force is very easy to control because it depends mainly on the angle of incidence "α" of the elastic member 38 on the retaining face 54. Such a parameter is easy to master.

The damping device 10 also allows damping of vibrations that specifically occur when the transmitted torque is high, irrespective of the rotation speed.

The invention claimed is:

1. An angular damping device (10) between a first coaxial shaft and a second coaxial shaft in a motor vehicle temporary wet coupling system, the angular damping device (10) comprising:
   a radial web (12) intended to be rotationally coupled to the first shaft;
   two radial guide washers (24) positioned axially one on each side of the web (12) and rotationally coupled to the second shaft;
   at least two first elastic members (38) with circumferential action circumferentially interposed in series between the radial web (12) and the guide washers (24); and
   a phase member (42) comprising at least two first radial phase lugs (48) circumferentially interposed between the two first elastic members (38) in series, the phase member (42) further comprising at least two friction pads, the at least two friction pads can be parted axially against each of the guide washers (24) by application of an axial clamping force;
   each of the at least two friction pads comprising a friction face (50) and at least one retaining face (54) for retaining at least one of the first elastic members (38) against the action of centrifugal force, the retaining faces (54) being axially arranged at a distance from one another and the first elastic member (38) being partially inserted between the two retaining faces (54) in the manner of a wedge, so that the axial component of the centrifugal force exerted on each of the retaining faces (54) by the first elastic member (38) clamps each of the friction faces (50) against the associated guide washer (24) with a dynamic clamping force.

2. The device (10) according to claim 1, wherein the at least one retaining face (54) of each of the at least two friction pads is in contact with the first elastic member (38) at an angle of incidence (α) ranging between 1° and 89° relative to the radial direction.

3. The device (10) according to claim 2, wherein the angle of incidence (α) ranges between 15° and 45°.

4. The device (10) according to any claim 1, wherein a static clamping force is constantly applied by elastic clamping means to separate the friction pads.

5. The device (10) according to claim 4, wherein each of the friction pads is formed by a resiliently flexible deformable lug, the deformable lug is mounted pre-stressed against the associated guide washer (24).

6. The device (10) according to claim 5, wherein at least one of the deformable lugs is formed by the first radial phase lug (48).

7. The device (10) according to claim 4, wherein an inner face of each of the two guide washers (24) comprises ramps (56) facing each other in such a manner as to vary the axial position of the friction faces (50) relative to a reaction face, so that the static clamping force varies according to the angular position of the phase member (42) relative to the guide washers (24).

8. An angular damping device (10) between a first coaxial shaft and a second coaxial shaft in a motor vehicle temporary wet coupling system, the angular damping device (10) comprising:
   a radial web (12) intended to be rotationally coupled to the first shaft;
   two radial guide washers (24) positioned axially one on each side of the web (12) and rotationally coupled to the second shaft;
   at least two first elastic members (38) with circumferential action circumferentially interposed in series between the radial web (12) and the guide washers (24);
   at least two second elastic members (40) with circumferential action, the at least two second elastic members (40) being circumferentially interposed in series between the web (12) and the guide washers (24); and
   a phase member (42) comprising at least two first radial phase lugs (48) circumferentially interposed between the two first elastic members (38) in series, the phase member (42) further comprising at least two friction pads, the at least two friction pads can be parted axially against each of the guide washers (24) by application of an axial clamping force;
   each of the at least two friction pads comprising a friction face (50) and at least one retaining face (54) for retaining at least one of the first elastic members (38) against the action of centrifugal force, the retaining faces (54) being axially arranged at a distance from one another and the first elastic member (38) being partially inserted between the two retaining faces (54) in the manner of a wedge, so that the axial component of the centrifugal force exerted on each of the retaining faces (54) by the first elastic member (38) clamps each of the friction faces (50) against the associated guide washer (24) with a dynamic clamping force;
   the phase member (42) further comprising at least one second radial phase lug (46) circumferentially interposed between the two second elastic members (40) in series.

9. The device (10) according to claim 1, wherein the phase member (42) includes two radial phase rings (44), each of the radial phase rings (44) includes at least one second radial phase lug (46) extending radially inwardly from the radial phase ring (44) and one of the at least two first phase lug (48) extending radially outwardly from the radial phase ring (44).

10. The device (10) according to claim 9, wherein each of the second phase lugs (46) is arranged in angular coincidence with one of the first phase lugs (48).

11. The device (10) according to claim 9, further comprising at least two second elastic members (40) with circumferential action, which are circumferentially interposed in series between the web (12) and the guide washers (24); wherein the at least one second radial phase lug (46) is circumferentially interposed between the two second elastic members (40) in series.

12. An angular damping device (10) between a first coaxial shaft and a second coaxial shaft in a motor vehicle temporary wet coupling system, the angular damping device (10) comprising:

a radial web (12) intended to be rotationally coupled to the first shaft;

two radial guide washers (24) positioned axially one on each side of the web (12) and rotationally coupled to the second shaft;

at least two elastic members (38, 40) with circumferential action circumferentially interposed in series between the radial web (12) and the guide washers (24); and a phase member (42) comprising two radial phase rings (44) axially arranged on both sides of the radial web (12) and at least two friction pads;

each of the radial phase rings (44) comprising at least two radial phase lugs (46, 48) circumferentially interposed between the two elastic members (38, 40) in series;

each of the radial phase rings (44) being mounted floating between the radial web (12) and one of the guide washers (24) and held in position through the contact between the at least two phase lugs (46, 48) and the at least two elastic members 38, 40;

the at least two friction pads can be parted axially against each of the guide washers (24) by application of an axial clamping force;

each of the at least two friction pads comprising a friction face (50) and at least one retaining face (54) for retaining at least one of the elastic members (38, 40) against the action of centrifugal force, the retaining faces (54) being axially arranged at a distance from one another and the elastic member (38, 40) being partially inserted between the two retaining faces (54) in the manner of a wedge, so that the axial component of the centrifugal force exerted on each of the retaining faces (54) by the elastic member (38, 40) clamps each of the friction faces (50) against the associated guide washer (24) with a dynamic clamping force.

13. The device (10) according to claim 12, wherein each of the radial phase rings (44) comprises at least two first phase lug (48) extending radially outwardly from the radial phase ring (44), and at least one second radial phase lugs (46) extending radially inwardly from the radial phase ring (44).

14. The device (10) according to claim 13, wherein each of the second phase lugs (46) is arranged in angular coincidence with one of the first phase lugs (48).

15. The device (10) according to claim 13, wherein at least two elastic members (38, 40) comprise at least two first elastic members (38) with circumferential action and at least two second elastic members (40) with circumferential action; both the at least two first elastic members (38) are circumferentially interposed in series between the radial web (12) and the guide washers (24).

16. The device (10) according to claim 15, wherein each of the at least two first radial phase lugs (48) is circumferentially interposed between the two first elastic members (38) in series; and wherein each of the one second radial phase lugs (46) is circumferentially interposed between the two second elastic members (40) in series.

* * * * *